United States Patent [19]

Ng

[11] Patent Number: 5,378,740
[45] Date of Patent: Jan. 3, 1995

[54] WATERBORNE EPOXY DERIVATIVE COMPOSITION

[75] Inventor: Yiuto D. Ng, San Francisco, Calif.

[73] Assignee: The Dexter Corporation, Pittsburgh, Calif.

[21] Appl. No.: 876,015

[22] Filed: Apr. 30, 1992
(Under 37 CFR 1.47)

[51] Int. Cl.$^6$ .................. C08L 63/00; C08K 5/09; C08K 5/51

[52] U.S. Cl. .................. 523/414; 524/145; 524/148; 524/395; 524/608; 525/486; 525/511; 525/514; 525/528; 525/512; 528/94; 528/96

[58] Field of Search .............. 523/414; 524/127, 145, 524/148, 395; 525/486, 511, 514, 528, 529, 512; 528/73, 94, 96

[56] References Cited

U.S. PATENT DOCUMENTS

| | | | |
|---|---|---|---|
| 3,331,886 | 7/1967 | Zimmerman et al. | 523/414 |
| 4,749,735 | 6/1988 | Dersch et al. | 524/127 |
| 4,800,215 | 1/1989 | Bertram et al. | 528/98 |
| 4,837,295 | 6/1989 | Drain et al. | 528/96 |
| 5,075,410 | 12/1991 | Arpin | 528/96 |
| 5,198,482 | 3/1993 | Phillips et al. | 524/94 |

FOREIGN PATENT DOCUMENTS

2080427  3/1990  Japan.

Primary Examiner—Tae H. Yoon
Attorney, Agent, or Firm—George A. Skoler

[57] ABSTRACT

A waterborne structural adhesive bonding primer composition (a) that can be effectively applied to an adherend for structural adhesive applications, (b) that emits a VOC content of less than about 250 grams per liter, (c) is thermally stable, and (d) may be employed with 350° F. (176.7° C.) cure epoxy resin systems, which contains the combination of (i) a dialkanol amine adduct of an oxazolidinone modified polyglycidyl ether of a tris(hydroxyphenyl)alkane dissolved in a water vehicle, and (ii) a rigid ring substituted polyethylenically unsaturated carboxylate, carboxamide or carboximide intimately dispersed in the water vehicle and the dialkanol amine adduct of an oxazolidinone modified polyglycidyl ether of a tris(hydroxyphenyl)alkane. Formulations are described that contain chromate-free corrosion inhibitors.

15 Claims, No Drawings

WATERBORNE EPOXY DERIVATIVE COMPOSITION

BRIEF DESCRIPTION OF THE INVENTION

A waterborne structural adhesive bonding primer suitable for use in bonding to metallic structures. The compositions contain a low concentration of volatile organic compounds ("VOCs") and comprises a water dispersible epoxy derivative resin and a polyunsaturated cyclic cross linking agent. Compositions that contain a chromate-free corrosion inhibitor system are described.

BACKGROUND TO THE INVENTION

Structural adhesive bonding primers serve three basic purposes: (1) they protect the adherend surface from being affected by the workshop environment; (2) they inhibit corrosion of the bonded surface during its service life; and (3) they provide a compatible surface to which the adhesive can bond for long-term strength. They should have excellent mar resistance, protect the adherend from re-oxidizing, and be readily cleaned prior to bonding using standard workshop procedures. Additionally, they should protect the adherend during high humidity conditions; from salt corrosive environments; and withstand the effects of numerous fuels, hydraulic fluids, and lubricating oils. Standard industry tests include hundreds of hours at elevated temperatures or at 100% relative humidity or at exposure to salt fog (100% relative humidity and 95° F. (35° C.)) environment. Exposure tests for several days, both at ambient and elevated temperatures, to various fluids and chemicals are common modes of evaluation by industry. The primers should not adversely affect the performance of the bonding adhesive. Typical industry requirements are tensile shear strengths up to 41.4 Mpa (6,000 psi), peel strengths up to 11.34 N/mm (65 pounds per lineal inch), and long-term service (up to 6,000 hours) at elevated temperatures (up to 232° C.). These prerequisites for a suitable adhesive bonding primer must be generally met before the primer achieves commercial acceptance.

The corrosion resistance required of a structural adhesive bonding primer is quite high, particularly when compared to a coating composition that is applied to a substrate for non-structural purposes. A structural adhesive bonding primer is part of a composite structure. It is the first layer applied to the metal adherend. The next layer is the adhesive. It is put on the adherend for the purpose of joining an adhering surface to the adherend. This results in the formation of a structural composite.

The criticality of stress corrosion of structural adhesive bonds is the subject of Bascom, *Adhesives Age*, pages 28, 29–35, April 1979. In this article, the author notes:

The most severe limitation to the use of structural adhesives is the susceptibility of the bond lines to attack by moisture. The effect of the moisture is generally considered a corrosion of the metal adherend, and evidence certainly exists to support this view. For example, in military operations in Southeast Asia, the seriousness of the problem was apparent from the extensive repair and refitting of aircraft caused by the delamination of aluminum skin and honeycomb structures.

Presently, there is no clear understanding of the mechanisms involved in adhesive bond stress corrosion, nor are there any well established means of predicting bond durability under moist or wet environments. In fact, there is disagreement as to whether the primary attack is on the adhesive or the metal adherend. As for predicting bond lifetimes, there is no generally accepted test method for adhesive bond stress corrosion.

The function of a structural adhesive bonding primer is to aid in keeping moisture from the adhesive-adherend interface and enhance the adhesion between the adherend and the adhesive. That action serves to minimize the impact of corrosion by acting as a barrier to moisture and passivating the adherend's surface from the impact of moisture that does penetrate to the adherend.

In the evolution of structural adhesive bonding primers, their formulations generally relied on dilute solvent solutions of modified epoxy or phenolic resins. These resins are generally considered innocuous, both being extensively used in food containers. However, materials used to cure these resins in adhesive bonding primers, such as amines, amides and imidazoles, may not be as innocuous. Solvents in the formulations have stimulated wide environmental concerns. The volatile organic compounds (VOCs) emitted by their evaporation from the adherend surface has been an ever increasing concern of industrial regulatory organizations.

Y. D. Ng and W. E. Rogers, in a paper entitled: "A Non-Chromated Water-Borne Adhesive Primer For Aerospace Applications" and given at the 33rd International SAMPE Symposium, during Mar. 7–10, 1988, discuss the environmental issues of adhesive primers. They point out that asbestos, at one time a favored raw material for adhesives, was virtually eliminated from the market since the early 1980's. They note that the aerospace industry has increased concern about using solvent-borne bonding primers.

"Their high VOC contents (80–90%) are a target that Regional Air Quality Management Boards, especially those in areas prone to substantial periods of air pollution, are aggressively seeking to regulate."

Illustrative of this concern are the strict air quality mandated by the South Coast Air Quality Management District.[1] Though Y. D. Ng and W. E. Rogers indicate that most solvent-borne adhesive primers have little difficulty complying with 1987 SCAQMD Rule 1124 VOC limit for adhesive primers at 850 grams/liter, they fail to point out that typical epoxy/phenolic solvent-based adhesive bonding primers at about 10 percent solids emit VOCs into the atmosphere at levels approaching 800 grams/liter. Such VOC levels have been accepted because of the high performance the solvent based primers bring to the application. With ever increasing environmental concerns, such VOC levels are becoming unacceptable and there is a strong demand for epoxy based adhesive bonding primers that accommodate environmental concerns. SCAQMD has set the VOC limit for adhesive bonding primers at 250 grams/liter minus water, starting Jan. 1, 1993. This accords with the trend set for the coatings industry.

[1] South Coast Air Quality Management District (SCAQMD) has jurisdiction over air quality in the Greater Los Angeles Basis in south California, U.S.A.

Such social reactions are stimulating the adhesive industry to find ways to reduce pollution by VOCs used as solvents in conventional adhesive bonding primers. Considerable emphasis exists to develop application technologies that reduce VOC emissions in adhesive bonding primer. A number of them have emerged to meet most but not all of the performance and application requirements, and at the same time meet emission requirements and regulations. One technology for overcoming the VOC problem involves the use of waterborne dispersions and solutions.

Clayton A, May, in his text entitled: *EPOXY RESIN Chemistry and Technology*, Second Edition, 1988, Published by Marcel Dekker, Inc., New York, N.Y., at page 766, makes the following characterization of waterborne coatings in general:

> Waterborne industrial coatings are attractive because they usually contain only small amounts of solvent and can meet the newer air pollution regulations. In addition, they minimize fire and health hazards. On the other hand, aqueous systems lack the versatility and frequently the quality of solvent systems. Because of sensitivity to atmospheric conditions, they often must be applied under stringent controlled conditions of suitable temperature and humidity. Problems of corrosion often necessitate the use of stainless steel equipment. Some problems can be met by careful choice of solvents used in most waterborne coatings.
>
> Waterborne coatings may be defined as coatings that contain water as the major volatile component and that utilize water to dilute the coating to application consistency. These coatings consist mainly of resinous binder, pigments, water, and organic solvent. The type of pigmentation and the method of incorporation of the pigment vary widely. It is usually easier to incorporate pigments directly into the organic phase where conventional dispersion techniques can be applied. . . .
>
> > Waterborne coatings can be made by dispersing or emulsifying the resin binder by use of added surfactants. This technique leads to opaque liquids. Because some hard resins are difficult or impossible to disperse directly into water, the resin sometimes can be dissolved in a water-immiscible solvent, and the resulting solution dispersed by the use of added surfactants. In this case, the solvent aids subsequent film coalescence. Surface activity or water dispersability also can be introduced into resin molecules by chemical modification of the resin by functional polar groups such as the carboxyl group.
> >
> > Some very finely dispersed resins appear as clear as [sic] slightly hazy liquids; they frequently are described as soluble, solubilized, colloidal dispersions, micro-emulsions, hydrosols, etc. These resins contain built-in functional groups that confer water "solubility" upon the resin, and, normally, external added surfactants are not used.
> >
> > Waterborne resin binders can be classified as anionic, cationic, or nonionic. Anionic dispersions are characterized by negative charges on the resin or by negative charges on the surfactant associated with the resin. Cationic dispersions have a positive charge on the resin or on the surfactant associated with the resin. Nonionic dispersions are those that have been dispersed by addition of nonionic surfactants or that contain a built-in hydrophilic segment such as polyethylene oxide which is part of the main chain of a relatively hydrophobic resin molecule.
>
> The waterborne dispersions and solutions are to be contrasted with the water containing emulsion systems (oil in water varieties). In the latter case, the emulsion particles contain a concentration of highly volatile, water immiscible solvent plus a surfactant that keeps the emulsified particles suspended in the continuous water phase. Consequently, emulsions tend to have shorter shelf life stability than dispersions. During application, the emulsions rely on solvents to coalesce the deposited particles coupled with the surfactant, in order to form a continuous film that is free of pin holes and other defects. The surfactants (surface active agents) are normally higher boiling materials that are not easily removed from coatings deposited on the adherend. Such materials often remain as part of the coating and interfere with adhesion of a later applied adhesive. In addition, the retained surfactant remains a long term VOC problem. Thus, emulsions may not effectively address the VOC problem where there is the necessity to have a coated layer on the adherend that enhances the structural bonding of the adhesive and the adhering surface. The waterborne dispersions and solutions can effectively address the VOC problem as well as the structural bonding issues.

Waterborne structural adhesive bonding primers introduce entirely different selection of resin and cure system, and introduce formulation problems not dealt with in solvent based adhesive bonding primer systems. For example, waterborne adhesive bonding primers are not as resistant to corrosive environments as are the more conventional solvent-borne adhesive bonding primers. The conventional epoxy resins used in solvent-based systems are not water soluble or effectively water dispersible.

Epoxy based adhesive bonding primers typically contain inhibitors. The most effective, and hence, the most widely used inhibitors are chromate salts such as potassium chromate, barium chromate, strontium chromate, zinc chromate and the like. They are usually part of the pigment composition of the formulation. Chromate pigments are listed as toxic substances under SARA Title III, Section 313.[2] They are listed as chemicals known to cause cancer or reproductive toxicity under California Proposition 65.[3] Their removal from any formulation is desirable, so long as the formulation possesses satisfactory corrosion inhibition.

[2]Superfund Amendments, a Re-Authorization Act of 1986 (SARA), Title III, Sections, 311, 312 and 313, United States Federal Regulation.
[3]Proposition 65 (California Governor's list of "Chemicals known to cause cancer reproduction toxicity"), State of California (U.S.A.) Regulation.

Y. D. Ng and W. E. Rogers, supra, discuss the development of a waterborne structural adhesive bonding primer that uses the same multi-functional epoxy novolac resin as was used in "Hysol's EA 9205R (a 350° F.) [176.7° C.] service, solvent-bone adhesive primer." The less polar epoxy groups on the resin were transformed into more polar hydroxyl moieties. "Further treatment produced the cationic salt of the resin which provided the desired solubility and physical property characteristics." A combination of inhibitors are mentioned as replacements for chromates. They are stated to be proprietary. Properties of the proposed adhesive primer are discussed.

Clarke, U.S. Pat. Nos. 3,687,897, patented Aug. 29, 1972, and 3,789,053, patented Jan. 29, 1974, describe the reaction product of epoxides with isocyanates to produce oxazolidinones containing the unit structure:

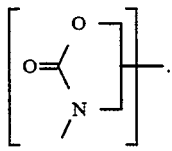

That work culminated in the development of coating compositions of dialkanolamine adducts of triglycidol ethers of trisphenols that is disclosed by Bertram et al., in U.S. Pat. No. 4,800,215, patented Jan. 24, 1989. The adducts of Bertram et al. may have the formula:

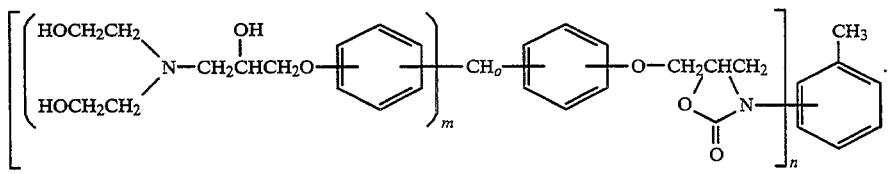

In the above formula, m has a value equal to 3-o, n is equal to 2, and o is 1 or 2, preferably 1.

These water soluble coating resins are described as suitable for use with amine-aldehyde, urea-aldehyde or phenol-aldehyde curing systems. The patentees indicate that the resultant coatings have excellent thermal stability and/or elongation. There is no apparent indication that those coating resins are suitable for making structural adhesive bonding primers.

The water soluble resins of U.S. Pat. No. 4,800,215 may be obtained neat. They may contain water soluble ether solvents such as monomethyl ether of ethylene glycol, dimethyl ether of ethylene glycol, monoethyl ether of ethylene glycol, diethylene glycol, monomethyl ether of diethylene glycol, monomethyl ether of 1,2-propylene glycol, monomethyl ether of 1,3-propylene glycol, monoethyl ether of 1,2-propylene glycol, and the like.

THE INVENTION

This invention relates to a waterborne structural adhesive bonding primer composition that
(a) effectively bonds to an adherend for structural adhesive applications,
(b) emits a VOC content of less than about 250 grams per liter,
(c) is thermally stable, and
(d) may be chromate-free or contain a minimal chromate content, yet possess excellent corrosion inhibition.

The waterborne structural adhesive bonding primer of the invention is suitably employed with 350° F. (176.7° C.) cure epoxy resin systems, and exhibits thermal stability for 6,000 hours at 350° F. (176.7° C.) and structural performance.

The invention is characterized as a waterborne structural adhesive bonding primer that is chemically distinctive because it contains the combination of (i) dialkanol amine adducts of an oxazolidinone modified polyglycidyl ether of a tris(hydroxyphenyl)alkane such as described in formula I. above, dissolved in a water vehicle, and (ii) a rigid ring substituted polyethylenically unsaturated carboxylate, carboxamide or carboximide intimately dispersed in the water vehicle and the dialkanol amine adduct of an oxazolidinone modified polyglycidyl ether of a tris(hydroxyphenyl)alkane. The invention contemplates other ingredients, such as formaldehyde-based resins, corrosion inhibitors, flow control aids, anti-foaming agents, pigments, dyes, fiber reinforcement, and the like. However, the invention emphasizes the unique combination of a water soluble epoxy-derived resin in which is dispersed a water insoluble rigid ring substituted polyethylenically unsaturated carboxylate, carboxamide or carboximide.

The invention contemplates using a variety of rigid ring substituted polyethylenically unsaturated carboxylates, carboxamides and carboximides. Illustrative suitable rigid ring substituted polyethylenically unsaturated carboxylates, carboxamides or carboximides are the compounds of the formulae:

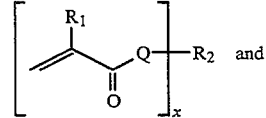

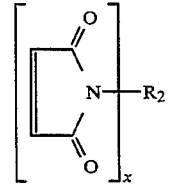

in which $R_1$ is either hydrogen or alkyl of 1 to about 4 carbon atoms: x is a whole number having a value of at least 2, preferably from 2 to about 4; Q is divalent oxygen, amino (i.e., —NH—), or imino (i.e., —NR$_3$— wherein R$_3$ is alkyl of 1 to about 4 carbon atoms, phenyl and substituted phenyl), and R$_2$ is a rigid cyclic moiety having a free valence equal to x. Illustrative of suitable rigid cyclic moieties are the aromatic ring structures and cycloaliphatic ring structures, especially the cycloaliphatic ring structures that contain an endo bridging unit such as methylene, ethylene, ethylidene, propylene, and the like, and/or a fused ring structure, which form a polycyclic structure.

In a preferred embodiment, the invention utilizes an aqueous dispersion containing an inhibitor combination that is free of or contains a minimal amount of chromate, an aqueous solution of the resin defined by formula I. above, and a dispersion of water-insoluble, finely divided aromatic substituted bismaleimide. In a further embodiment of the invention, the structural adhesive bonding primer composition contains a formaldehyde resin such as a melamine-formaldehyde resin, a urea-formaldehyde resin, a phenol-formaldehyde resin, and the like.

The invention utilizes what has been taught to be a coating resin to produce an extremely effective structural adhesive bonding primer that meets essentially all of the structural adhesive requirements and the most stringent VOC industrial requirements to date.

DETAILED DESCRIPTION OF THE INVENTION

The resin system of the invention contains two essential components. One is the water soluble modified epoxy resin characterized by formula I. above. That resin is transformed into a useful structural adhesive bonding primer resin by combining with it a rigid ring substituted polyethylenically unsaturated carboxylate, carboxamide or carboximide. It is combined as an intimately dispersed component in the water vehicle for the water soluble modified epoxy resin. As noted above, the resin formulation may contain other resin additives, such as the formaldehyde-based resins. Their provision in the composition of the invention is not considered critical to the invention.

It is not well understood how the solid, dispersed rigid ring substituted polyethylenically unsaturated carboxylate, carboxamide or carboximide reacts with the water soluble modified epoxy resin characterized by formula I. above. The following mechanisms are offered, without intent to being bound to them, to explain the reactions that appear to take place as evidenced by the exceptional properties possessed by the cured primers of the invention.

The resin is dissolved in water and the rigid ring substituted polyethylenically unsaturated carboxylate, carboxamide or carboximide is physically dispersed in the same water vehicle. As such, there is little impetus for a chemical reaction between the two materials. As the composition of the invention is heated in the curing operation, the phase dissimilarity starts to disappear. Eventually, enough water is evaporated from the coating during the curing operation so that either component or another component of the composition acts as a compatibilizer[4] of at least a part of the reactive components so that a reaction may take place. Two reactions are speculated. When the resin is of the formula (IV.):

tion with the diethanolamine. In formula IV., it is the left designated tertiary hydrogen. The other designated tertiary hydrogen is part of the trisphenyl F residue, and it is thought that the bulky phenyl groups will sterically hinder grafting at that site. Also to be considered is the fact that the rigid ring substituted polyethylenically unsaturated carboxylates, carboxamides or carboximides are capable of reacting with themselves by a thermally induced addition reaction. It is quite possible that a combination of these reactions occurs in the formation of the desired cured structural adhesive bonding primer.

[4]Phase dissimilarity may be mitigated by the presence of water soluble formaldehyde based resin, serving to compatabilize the resin of formula I. and the rigid ring substituted polyethylenically unsaturated compound.

The rigid ring substituted polyethylenically unsaturated carboxylates, carboxamides or carboximides are not narrowly defined classes of materials. As pointed out above, they are characterized as possessing the structures:

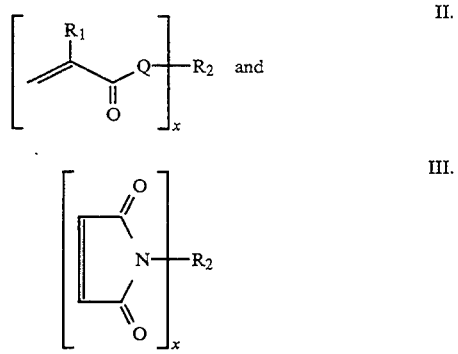

In formula II., the ethylenic unsaturation defined within the brackets constitutes an acrylic moiety. In the terms of this invention, the term "acrylic" is intended to encompass the family of acrylics, in which $R_1$ is either

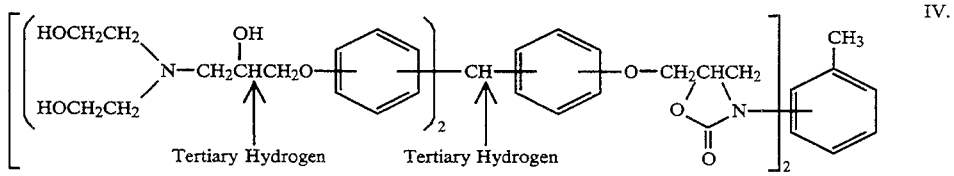

that is, the resin is the reaction product of a tris(-glycidoxy)-trisphenol F resin (e.g., formed by the reaction of trisphenol F and epichlorohydrin in the presence of a base) and toluene diisocyanate (such as 2,4-toluene diisocyanate, 2,6-toluene diisocyanate, and the 80/20 standard mixture of the two), followed by reaction with, e.g., diethanolamine, two possible reactions are evident. One can occur by reaction of the rigid ring substituted polyethylenically unsaturated carboxylate, carboxamide or carboximide across the hydroxyl groups by a Michael addition reaction and the other can occur via grafting at one or more of the tertiary hydrogens. The hydroxyl and tertiary hydrogen are part of the resin structure. The tertiary hydrogens most amenable to reaction are those produced by the glycidyl reachydrogen or alkyl of 1 to about 4 carbon atoms. In the case of formula III., the ethylenic unsaturation defined within the brackets is a maleimide group. In the terms of this invention, the term "maleimide" is intended to encompass the family of maleimides, such as those in which hydrogens attached to unsaturated carbons are replaced with alkyl groups of 1 to about 4 carbon atoms. As noted previously, x is a whole number having a value of at least 2, preferably from 2 to about 4; Q is divalent oxygen or amino (i.e., —NH—), or imino (i.e., —NR$_3$— wherein $R_3$ is alkyl of 1 to about 4 carbon atoms, phenyl and substituted phenyl), and $R_2$ is a rigid cyclic moiety having a free valence equal to x.

Illustrative of suitable maleimides encompassed by formula III. are the following:

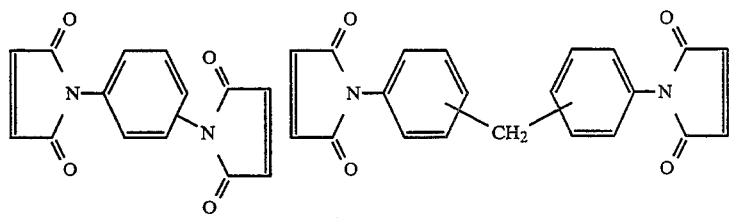
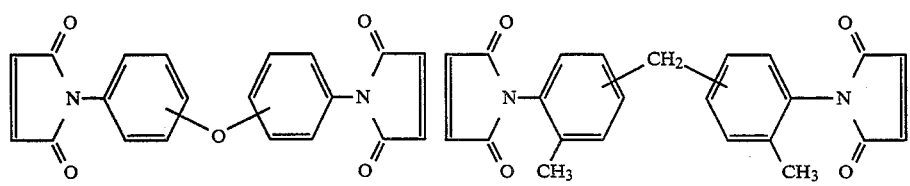
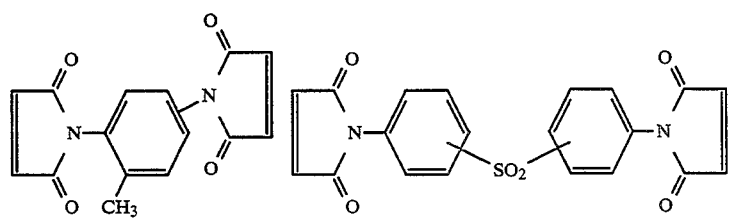
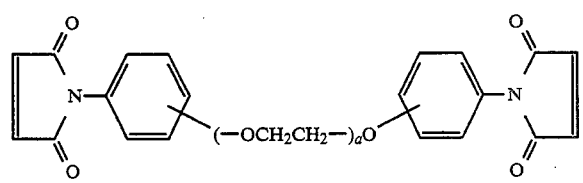
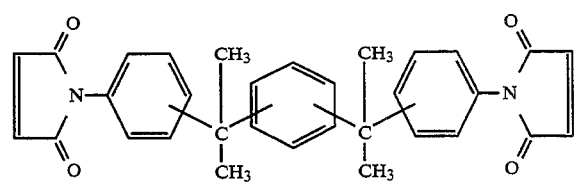
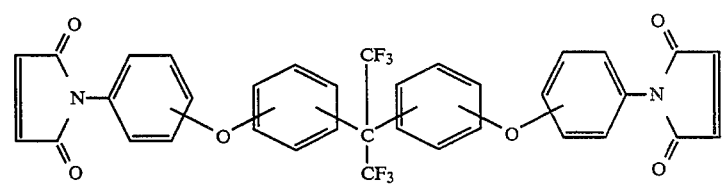
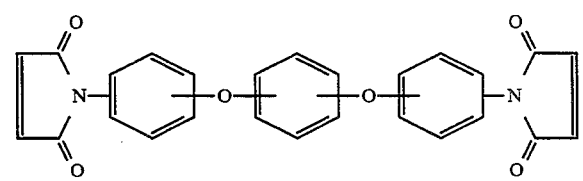
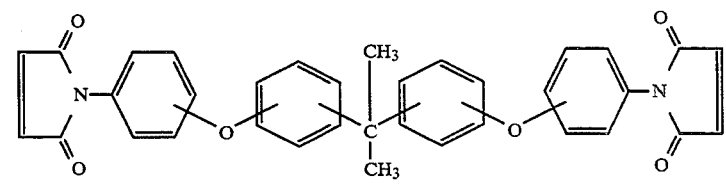

-continued
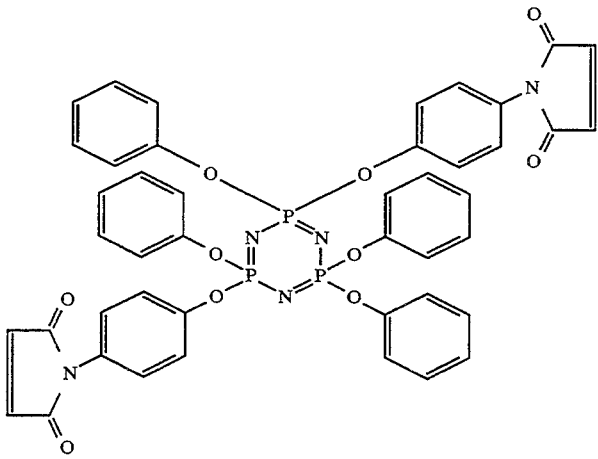
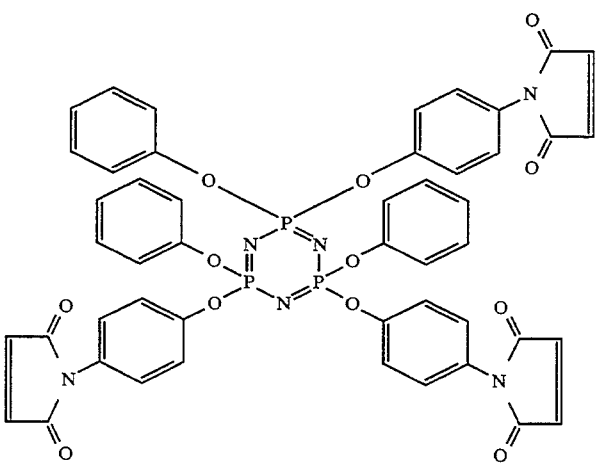
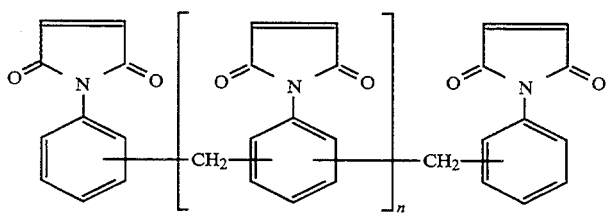
Suitable Polyacrylics that may be employed include the following:
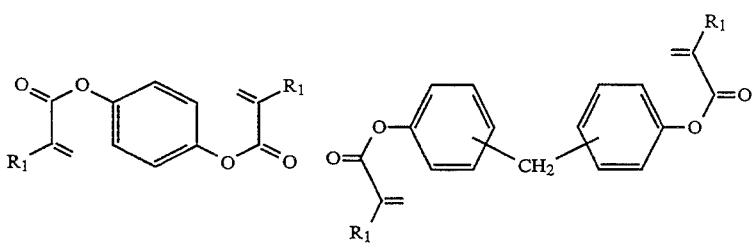

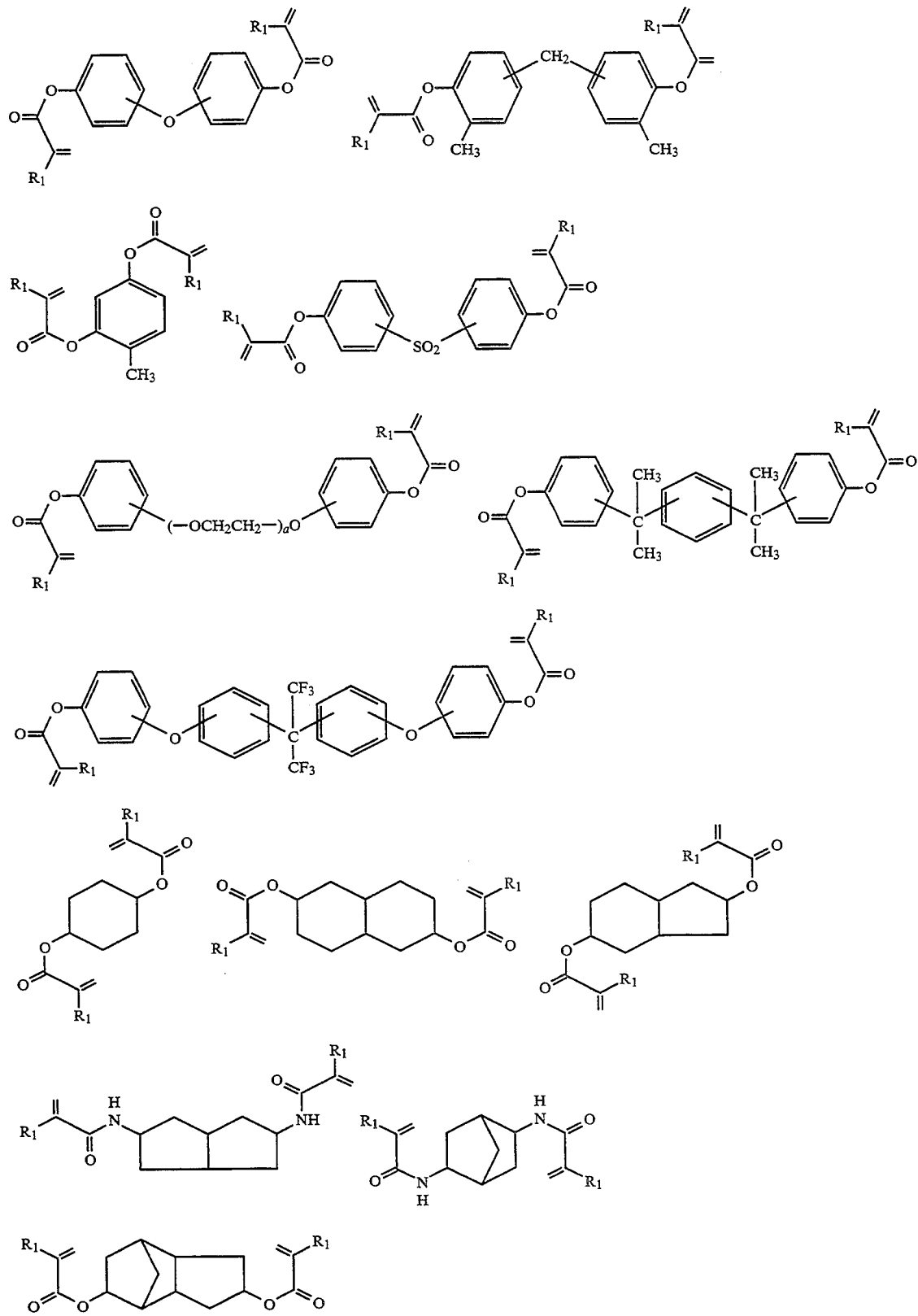

In the above formulae, $R_1$ has the definition recited above. Preferably, $R_1$, is hydrogen or methyl, thus representing acrylic per se and methacrylic per se. Though the above illustrates a plurality of suitable rigid ring substituted polyethylenically unsaturated carboxylates, carboxamides or carboximides, the invention is not limited to them. Only those rigid ring substituted polyethylenically unsaturated carboxylate, carboxamide or carboximide compounds that meet the criteria of the invention in forming effective adhesive bonding primers equivalent to those specifically disclosed are intended to be encompassed herein.

As indicated above, the composition of the invention may contain a number of other ingredients that contribute to some of the ultimate applications of the invention. One of those is the formaldehyde-based resins. As described in U.S. Pat. No. 4,800,215, the soluble coating compositions of dialkanolamine adduct of triglycidol ethers of the modified trisphenol are cured by amine-aldehyde resins, melamine-aldehyde resins, urea-aldehyde resins, and phenol-aldehyde resins. Such resins can be used in the practice of this invention. They may assist in the cure by acting as a compatibilizer for the rigid ring compound and the dialkanolamine adducts of triglycidol ethers of the modified trisphenol resins or act as a coreactant of the dialkanolamine adducts of triglycidol ethers of the modified trisphenol resins. However, the utilitarian properties of the structural adhesive bonding resin of the invention are not considered to be dependent upon their presence in the primer composition.

This conclusion is supported by the following differential scanning calorimetry (DSC)[5] comparative runs. Each run pre-dried the materials under vacuum. The resin was that portrayed in formula IV. The rigid ring substituted polyethylenically unsaturated compound was a bismaleimide of the formula:

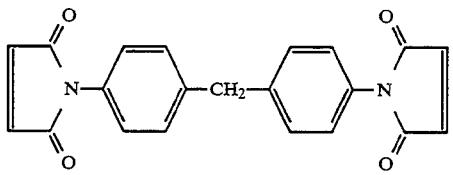

V.

1. The epoxy unmodified resin (i.e., prior to reaction with diethanolamine) alone showed no self reaction exotherm below 300° C. (572° F.)
2. The bismaleimide of formula V. showed a sharp melting point at about 160° C. (320° F.) and then reacted with itself to cure in the 200°–300° C. (392°–572° F.) range with a maximum rate at 253° C. (487.4° F.).
3. The water soluble resin of formula IV. showed no self reaction exotherm before about 220° C. (428° F.) and there was a suggestion from the data that some thermal degradation occurred.
4. That same resin modified with Cymel ® 303 (see column 4, lines 55–56, of U.S. Pat. No. 4,800,215, supra), hexamethoxymethylmelamine resin with a 1.7 degree of polymerization, sold by American Cyanamid Company, Wayne, N.J. 07470, showed a reaction before 250° C. (482° C.), but indicated that the Cymel ® 303 reaction with the hydroxyl groups in the resin occurred in the 250°–320° C. (482°–608° F.) range with a rate maximum at about 296° C. (564.8° F.).
5. The water soluble resin of formula IV. containing both the bismaleimide of formula V. and Cymel ® 303, showed a strong cure of the bismaleimide of formula V. at 130°–232° C. (266°–449.6° F.), with a maximum rate at 181° C. (357.8° F.). This was an activation of the bismaleimide reaction, dropping the rate maximum of bismaleimide from 252° C., to 181° C. The results suggest bismaleimide cure acceleration or an alternate cure reaction of the bismaleimide of formula V. with the water soluble resin such as by Michael addition or grafting. The Cymel ® 303 cure with the resin hydroxyl groups still occurs over the 230°–300° C. (446°–572° F.) range, which is above practical cure conditions of 350° F. (176.7° C.) for the primer.
6. The cure reaction of the water soluble resin with bismaleimide of formula V., without the presence of Cymel ® 303, exhibited a strong reaction exotherm in the 140°–230° C. (284°–446° F.) range, with the maximum occurring at 161° C. (321.8° F.). This indicates that the cure does not involve the Cymel ® 303 resin, and that the bismaleimide of formula V. reaction initiation at lower temperature still occurred.

[5]See Clayton A. May, supra, pp. 1127–36.

The conclusion to be drawn from items 1.–6. above is that the cure reaction of the water soluble resin of formula IV. is dependent on the presence of the bismaleimide. The Cymel ® 303 hydroxyl reaction appears not to have occurred.

As indicated above, the essential combination of the water soluble modified epoxy resin characterized by formula I. above, and the rigid ring substituted polyethylenically unsaturated carboxylate, carboxamide or carboximide compounds, is what distinguishes the invention. However, for development of this combination into a suitable system for commercial applications, other ingredients are provided to the formulation. As stated above, a structural adhesive bonding primer should possess appropriate corrosion inhibitors. Corrosion occurs primarily as a result of electrochemical processes. An anodic surface is formed at the interface between the substrate and the primer. Substrate ions, e.g. $Fe^0$ and $Al^0$ are oxidized, and go into solution. Electrons that are released from this reaction flow to the cathodic surface where they react with electrolytes such as water and salt solution. The formation of this circuit, and the subsequent chemical reactions, results in corrosion. The inhibitors act to prevent this corrosion through anodic passivation.

The most effective, and hence, the most widely used inhibitors are chromate salts such as potassium chromate, barium chromate, strontium chromate, zinc chromate and the like. They are usually part of the pigment composition of the formulation. Chromate pigments are listed as toxic substances. Their removal from any formulation is desirable, so long as the formulation possesses satisfactory corrosion inhibition. In the case of this invention, chromate pigments may be employed and an effective corrosion inhibition will be achieved. In recognition of the environmental concerns over the use of chromates, there is described herein a combination of inhibitors that effects essentially the same quality of corrosion resistance as the chromates without introducing a toxic effect.

A particularly effective combination of corrosion inhibitors for the waterborne structural adhesive bonding primer of the invention comprises at least two inhibitors, one being zinc 5-nitroisophthalate and the other being zinc phosphate. To enhance the corrosion performance, where needed, of the primer of the invention, a small amount of one of the chromates typically used as a corrosion inhibitor may be added to the formulation. A particularly preferred one is barium chromate. Other corrosion inhibitors may be added to the formulation to meet specific commercial requirements. However, overall effective performance is achieved with the combination of zinc 5-nitroisophthalate and zinc phosphate.

The commercial success of a structural adhesive bonding primer is as much dependent upon handling properties as it is on physical properties. Though the utility of the invention is strongly dependent upon the novel combination of the water soluble modified epoxy resin characterized by formula I. above, and the rigid ring substituted polyethylenically unsaturated carboxylate, carboxamide or carboximide compounds, its commercial utility is also dependent on the handling characteristics of the primer during deposition on the adherend surface. For that reason, a coating aid such as a flow leveler may be required in a commercial formulation of the composition of the invention in order to avoid coating attributes such as fisheyes, orange peel, blushing, and the like. A variety of such materials are suitable, but the choices are somewhat limited by the fact that the composition contains water. For example, a flow leveler that is incompatible with water and any other component of the primer composition would not be expected to provide flow leveling. A particularly desirable flow leveler for the compositions of this invention is soy lecithin and soy lecithin based materials. Water soluble solvents, also soluble in the composition, may be used to aid in flow control as well. Alkanols containing 1 to about 5 carbon atoms may be used for this purpose. A particularly suitable alkanol is isopropanol. A glycol ether, which is normally a part of the water soluble resin composition, such as the monoalkyl or dialkyl ethers, may be used to assist in flow control. Suitable glycols include ethylene glycol, 1,2-propylene glycol and 1,3-propylene glycol. The monomethyl glycol ethers are particularly useful.

The structural adhesive bonding primer of the invention may contain from about 10 to about 40, preferably from about 15 to about 30, weight percent of the weight of the primer formulation of the water soluble resin encompassed by formula I. The rigid ring substituted polyethylenically unsaturated carboxylate, carboxamide or carboximide intimately dispersed in the water vehicle is typically present in the primer in an amount of from about 5 to about 35 weight percent, preferably from about 10 to about 30 weight percent of the weight, basis primer formulation weight. The inhibitor pigment content may range from about 0.5 to about 10 weight percent of the weight of the primer composition.

The structural adhesive bonding primer may be applied to an adherend by any of the coating techniques, including spray coating (conventional and electrostatic), pour coating, dip coating, brushing, and the like. Usually, the higher solids primer compositions are applied by dip and pour coating procedures.

Typical primer formulations encompassed by the invention are set forth in the following table, which characterizes the relative concentrations in percent by weight:

| Example No. | 1 | 2 | 3 | 4 | 5 |
|---|---|---|---|---|---|
| Resin of Formula IV. formulation (50% solids), see description below | 22.41 | 22.53 | 22.52 | 24.56 | 30.51 |
| ByK-156, an anionic polymeric dispersant (ammonium salt of an acrylic acid copolymer), sold by BYK Chemie, Wallingford, CT, U.S. | 0.32 | — | — | — | — |
| Soy Lecithin | — | 0.16 | 0.16 | 0.17 | 0.21 |
| Isopropanol | 0.44 | — | — | — | — |
| Bismaleimide of formula V. | 16.54 | 16.63 | 16.62 | 9.06 | 11.26 |
| Zinc Phosphate | 0.98 | 0.98 | 0.98 | 1.07 | 1.33 |
| Zinc 5-nitroisophthalate | 0.2 | 0.2 | 0.2 | 0.22 | 0.27 |
| Zircoaluminate coupling agent | 1.3 | 1.14 | 1.14 | 1.24 | 1.54 |
| Green pigment (colorant) | 0.45 | 0.45 | 0.45 | 0.49 | 0.61 |
| Foammaster ® NS-1 antifoamer | — | 0.45 | 0.45 | 0.49 | 0.61 |
| Deionized Water | 57.53 | 57.33 | 56.44 | 62.53 | 52.26 |
| Acetic Acid | 0.13 | 0.15 | 0.15 | 0.16 | 0.20 |
| % solids | 30 | 30 | 35.34 | 25 | 31.5 |

The above formulations may be modified by the small addition of a chromate, such as barium chromate, in an amount based on the weight of the primer, of from about 0.05 to about 2 weight percent. The resin in the above formulation contains 50% by weight of resin and Cymel ® 303, measured by the reactants and solvents used in its manufacture (see Example 3 of U.S. Pat. No. 4,800,215), as follows:

| Ingredient | Amount (% by weight) |
|---|---|
| [structure: $\left[\left(CH_2CHCH_2O\!-\!\underset{2}{\underbrace{\phantom{X}}}\right)\!-\!CH\!-\!\underset{}{\underbrace{\phantom{X}}}\!-\!O\!-\!CH_2CHCH_2\underset{O}{\overset{O}{\diagdown}}\!\!N\!-\!\underset{}{\underbrace{\phantom{X}}}\!-\!CH_3\right]_2$] | 27.8 |
| Diethanolamine | 14.3 |
| Acetic Acid | 2.9 |
| Cymel ® 303 | 5.0 |
| Dowanol ® PM* | 9.1 |
| Water | 40.9 |

*Monomethyl ether of 1,2-propylene glycol

PRIMER MANUFACTURING PROCEDURE FOR EXAMPLES 1–5

The resin is mixed in a Cowles ® mixer under a strong vortex for about 10 minutes. A small amount of deionized water is added. Mixing is resumed under a strong vortex. The bismaleimide, zinc phosphate, zinc 5-nitroisophthalate and the green pigment are added followed by mixing for about 45 minutes. The maximum temperature at this time should not exceed about 90° F. (32.2° C.). The zircoaluminate coupling agent and Foammaster ® NS-1 antifoamer are added followed by mixing for about 10 minutes. The mixture is given two passes on a sandmill grinding mill, cooling between passes to 90° F. (32.2° C.), or until a grind of >7 on the N.S. scale is achieved. The temperature during the grinding procedure is kept below 110° F. (43.3° C.). Another increment of the deionized water is used to wash the mill and add to the mix. The pH is adjusted with glacial acetic acid to 6.5–6.8, and the solids are adjusted with deionized water to 30%. The mix is pumped through 5 micron filters. The resulting mix has a Zahn cup viscosity of 13–25 seconds. The mix is stored at 40° F., but may be maintained at temperatures ranging from about 0° F. (−17.8° C.) to about 40° F. (4.4° C.).

The grind may be carried out in other types of equipment such as a pebble or media mill. It is important to obtain of a good fineness of grind and admixture of the components.

I claim:

1. A waterborne structural adhesive bonding primer composition suitable for (a) effective bonding to an adherend for structural adhesive applications, (b) containing a low concentration of VOCs so that it emits a VOC content of less than about 250 grams per liter, and (c) providing thermal stability, which contains the combination of (i) a dialkanol amine adduct of an oxazolidinone modified polyglycidyl ether of a tris(hydroxyphenyl)alkane dissolved in a water vehicle, and (ii) a rigid ring substituted polyethylenically unsaturated carboxylate, carboxamide or carboximide intimately dispersed in (i).

2. The primer composition of claim 1 wherein the primer composition contains a formaldehyde-based resins and a corrosion inhibitor.

3. The primer composition of claim 2 wherein the primer composition contains a flow control aid.

4. The primer composition of claim 1 wherein the dialkanol amine adduct of an oxazolidinone modified polyglycidyl ether of a tris(hydroxyphenyl)alkane has the formula:

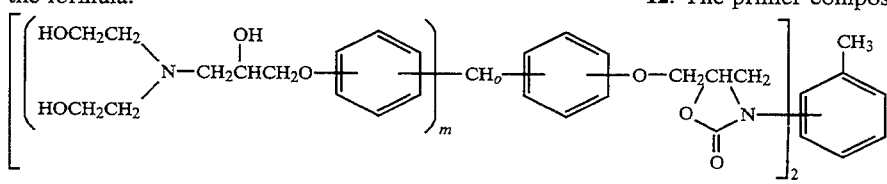

wherein m has a value equal to 3-o, n is equal to 2, and o is 1 or 2.

5. The primer composition of claim 1 wherein the rigid ring substituted polyethylenically unsaturated carboxylates, carboxamides and carboximides is encompassed by the formula:

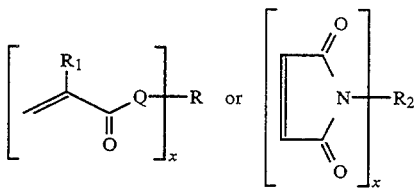

in which $R_1$ is either hydrogen or alkyl of 1 to about 4 carbon atoms; x is a whole number having a value of at least 2; Q is divalent oxygen, amino or imino, and $R_2$ is a rigid cyclic moiety having a free valence equal to x.

6. The primer composition of claim 5 wherein the rigid cyclic moiety comprises an aromatic ring structure or cycloaliphatic ring structure.

7. The primer composition of claim 6 wherein the cycloaliphatic ring structure contains an endo bridging unit or a fused ring.

8. The primer composition of claim 1 wherein the composition comprises an inhibitor that is either chromate-free or contains from about 0.05 to about 2 weight percent chromate.

9. The primer composition of claim 8 wherein the inhibitor is a combination of zinc 5-nitroisophthalate and zinc phosphate.

10. The primer composition of claim 1 wherein the composition contains a formaldehyde resin selected from the group consisting of a melamine-formaldehyde resin, a urea-formaldehyde resin and a phenol-formaldehyde resin.

11. The primer composition of claim 4 wherein the dialkanol amine adduct of an oxazolidinone modified polyglycidyl ether of a tris(hydroxyphenyl)alkane has the formula:

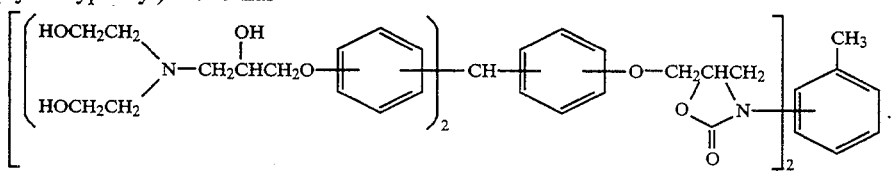

12. The primer composition of claim 11 wherein the rigid ring substituted polyethylenically unsaturated carboxylates, carboxamides and carboximides is a bismaleimide of the formula:

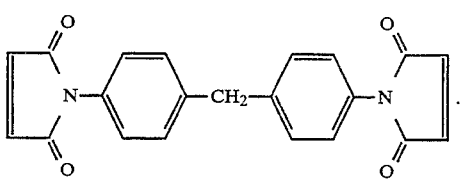

13. The primer composition of claim 12 wherein the composition contains a flow control aid and a corrosion inhibitor.

14. The primer composition of claim 13 wherein the flow control aid is a soy lecithin.

15. The primer composition of claim 14 wherein the corrosion inhibitor comprises a combination of zinc 5-nitroisophthalate and zinc phosphate.

* * * * *